Dec. 31, 1940.    J. R. JOHNSON    2,227,410
MACHINE TOOL
Filed July 29, 1937    6 Sheets-Sheet 2

INVENTOR
John R. Johnson
By Parker, Carlson, Pitzner & Hubbard
ATTORNEYS

Dec. 31, 1940.    J. R. JOHNSON    2,227,410
MACHINE TOOL
Filed July 29, 1937    6 Sheets-Sheet 3

INVENTOR
John R. Johnson
By Parker, Carlson, Pitzner & Hubbard
ATTORNEYS

Dec. 31, 1940.  J. R. JOHNSON  2,227,410
MACHINE TOOL
Filed July 29, 1937   6 Sheets-Sheet 4

INVENTOR
John R. Johnson
By Parker, Carlson, Pitzner & Hubbard
ATTORNEYS

Dec. 31, 1940.   J. R. JOHNSON   2,227,410
MACHINE TOOL
Filed July 29, 1937   6 Sheets-Sheet 5

INVENTOR
John R. Johnson
By Parker, Carlson, Pitzner & Hubbard
ATTORNEYS

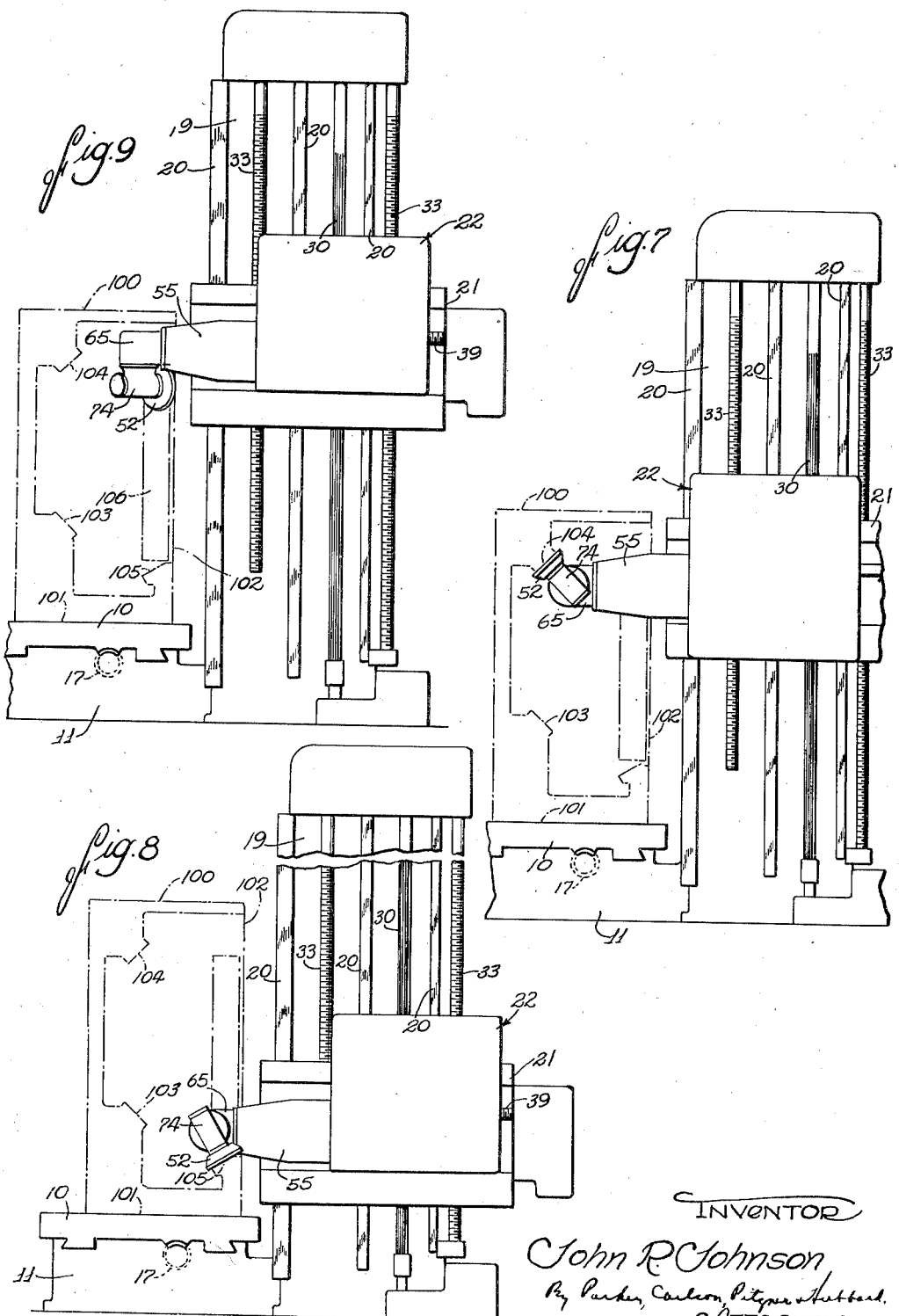

Patented Dec. 31, 1940

2,227,410

UNITED STATES PATENT OFFICE 2,227,410

MACHINE TOOL

John R. Johnson, Rockford, Ill., assignor to The Ingersoll Milling Machine Company, Rockford, Ill., a corporation of Illinois Application July 29, 1937, Serial No. 156,287

5 Claims. (Cl. 90—16)

The invention relates to machine tools and more particularly to improvements in machine tools of the type commonly known as open-side milling or boring machines.

One object of the present invention is to provide a machine tool of the type set forth which is capable of extreme flexibility of adjustment of the cutter position so as to accommodate the machining of both inner and outer surfaces of work pieces even though such surfaces be located in a great variety of angular positions, all without sacrifice in the precision of the work performed or in the power available for the metal removing operations.

Another object is to simplify and increase the ruggedness of the cutter mounting in a machine of the type set forth by mounting the cutter spindle on a slide which is supported on spaced parallel ways carried by the vertically movable saddle and extending transversely of the work table.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which Figure 1 is a perspective view of a machine tool embodying the invention, portions of the bed and work supporting table being broken away.

Figs. 6, 7, 8 and 9 illustrate diagrammatically the position of the cutter for machining a wide variety of differently located work surfaces.

Figure 1:
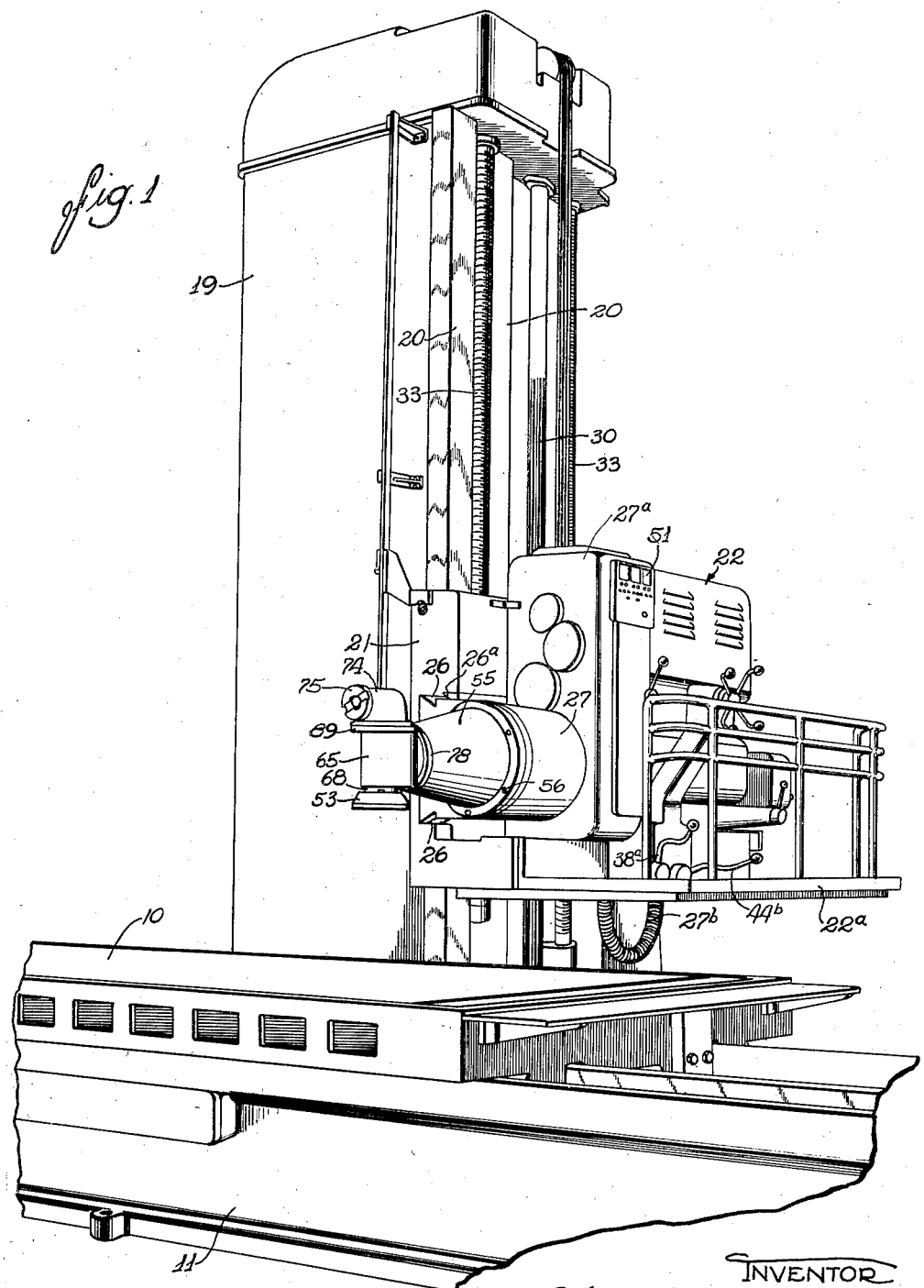

Referring more particularly to Fig. 1 of the drawings, the invention has been shown herein for purposes of illustration as embodied in a so-called open-side milling or boring machine comprising a work support in the form of a table 10 mounted for horizontal sliding movement on a bed 11. The table may be advanced at either a rapid traverse rate or at a relatively slower feed rate by any suitable power actuated mechanism. Herein, this is accomplished by a rapid traverse motor 12 (Fig. 2) and a feed motor 13 operatively connected to the table 10 through a differential gear mechanism 14, connected through a worm gear and worm 15, to an elongated pinion 16 meshing with a split tooth worm 17, which in turn meshes with a rack 18 fast on the table 10.

Provision has been made for the use of several metal removing or cutting tools and as will hereinafter appear in greater detail, the supporting mechanism for these cutting tools is of such character that they may be positioned with great freedom of movement to operate upon portions of a work piece located in a variety of angular positions and either on the exterior of the work piece or at some point or points within a hollow work piece. The tool supporting mechanism embodies a vertical column 19 (Fig. 1) which is preferably fixedly mounted on the floor at one side of the table 10 and provided with vertical ways 20 on a lateral face thereof. A saddle 21 is arranged to slide vertically in the ways 20. The saddle in turn carries a tool head assembly designated generally by the numeral 22 and mounted in a novel manner for bodily endwise movement in a horizontal direction relative to the saddle and transversely of the table 10.

The tool head assembly 22 embodies a rotatable tool driving spindle in the form of a sleeve 23 (Fig. 2) as well as a self-contained power actuating unit therefor shown in the form of an electric motor 24 connected to the spindle 23 through gearing 25. The spindle sleeve is journaled and held against endwise movement in a tubular extension 27 projecting from a box-like casing 27ª in which the motor 24 and drive gearing are housed. Along the rear side, the casing and the extension are formed with dovetail surfaces 26 mating in spaced parallel ways 26ª formed in the front face of the saddle 21 and extending horizontally. The spindle sleeve is thus supported horizontally for axial movement so that the tool carried by the spindle may, by sliding the tool head along the ways 26ª, be disposed in different positions transversely of the table 10. Power is supplied to the motor 24 through conductors within a flexible cable 27ᵇ (Fig. 1).

By slidably mounting the tool head 22 on the saddle 21 in the manner described above, adjustment of the tool transversely of the table may be effected without shifting the table or the column as has been the practice heretofore. As a result the spindle is supported with greater rigidity throughout its wide range of axial adjustment. In addition, by locating the ways 26 on the rear side of the tool head, long and rugged guideways may be employed while at the same time permitting the driving parts to be arranged compactly on the head in front of the guideways.

Figure 2:
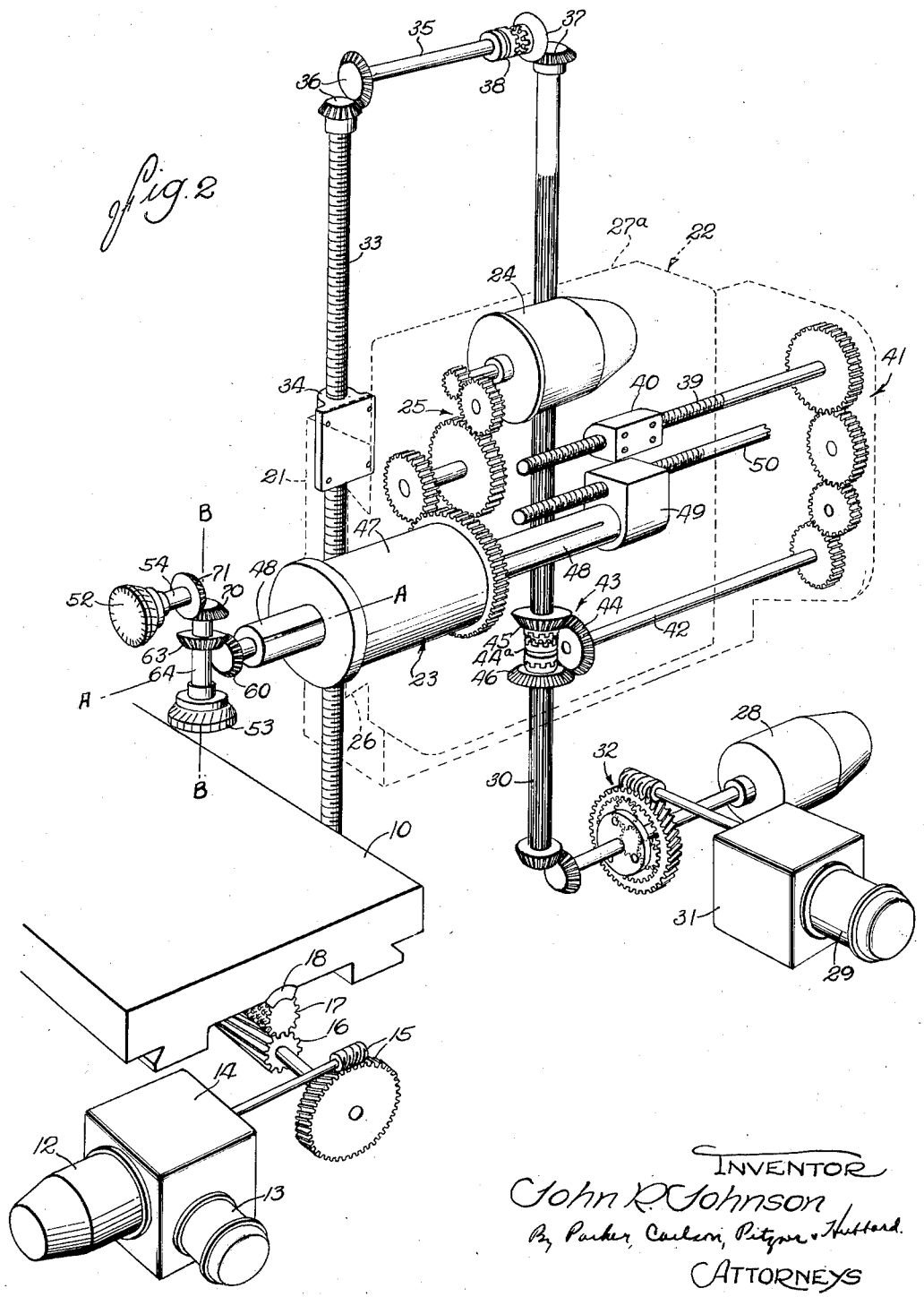
Fig. 2 is a diagrammatic illustration of the driving mechanism for the various elements of the machine tool shown in Fig. 1.

A single power actuating mechanism is preferably utilized for advancing the saddle 21 along the vertical ways 20 as well as for sliding the tool head assembly 22 transversely with respect to the saddle. As shown in Fig. 2, this mechanism has been illustrated in the form of a rapid traverse motor 28 and a feed motor 29 connected to a vertical spline shaft 30 on the column 19 through a speed change gearing 31 and a differential gear mechanism 32. The spline shaft 30 is connected to the saddle 21, for effecting translatory movement thereof, through a pair of lead screws 33 having traveling nuts 34 thereon fast on the saddle and connected to the spline shaft 30 through an intermediate shaft 35 and miter gears 36 and 37. A clutch 38 interposed between the miter gears 37 and the intermediate shaft 35 is arranged to be operated at will by a hand lever 38ᵃ to connect the spline shaft 30 to or disconnect the same from the lead screw 33.

Similarly, translatory motion is imparted to the tool head assembly 22 from the rotatable spline shaft 30 through the medium of a lead screw 39 journaled in the casing 27ᵃ and fast against endwise movement with respect to the saddle 21, this lead screw being threaded in a traveling nut 40 fast on the casing 27ᵃ. The screw 39 is driven through gearing 41 and a shaft 42 connected to the spline shaft 30 through a clutch mechanism 43. The latter includes a bevel gear 44 fast on the shaft 42 and meshing with a pair of bevel gears 45 and 46 which are loose on the shaft 30 and adapted to be engaged selectively by an axially shiftable collar 44ᵃ splined on the shaft. The collar 44ᵃ may be shifted by a hand lever 44.

For some operations, particularly boring, it may be desirable to position a cutting tool at a point beyond the range of horizontal traversing movement of the tool head assembly 22. To provide for this, a shaft or boring bar 48 is extended through and splined within the spindle sleeve 23. The cutter supporting end of this bar may be projected outwardly from the sleeve 23 by a suitable traversing mechanism shown in the form of a traveling nut 49 fast on the other end of the bar and threaded on a screw 50. The latter may be driven from the spline shaft 30 through a suitable gearing mechanism and a clutch (not shown).

A central control station for all of the power actuating mechanisms is preferably provided on the tool head assembly 22. This may, for example, take the form of a switchboard 51 (Fig. 1) and the various clutch control levers which are disposed within the convenient reach of an operator standing on a platform 22ᵃ also supported by the tool head. This advantageous arrangement is made possible by supporting the tool head from its rear side through the medium of the spaced guideways 26ᵃ.

In the use of an open side milling machine of the character described above, a milling cutter may be mounted directly on the end of the spindle 23 or, the cutter shank may be inserted in the recessed end of the bar 48. In the latter location, the cutter may also be used for boring operations. In the illustrated machine a novel attachment has been provided for supporting face milling cutters 52 and 53 (Figs. 2 and 3) in a manner such as to permit the milling of work surfaces disposed in widely varying angular positions exteriorly or interiorly of a work piece on the table 10. For this purpose, the cutter 52 is disposed with its axis disposed parallel to and spaced from the axis A—A of the spindle 23 and is mounted for adjustment bodily around the axis A—A and also around an axis B—B extending transversely of and intersecting the axis A—A and the cutter axis.

To thus support the cutter 52, a reinforced tubular casing 55 preferably of conical shape is clamped securely, as by cap screws 56, against the flanged outer end of the extension 27 in which the spindle 23 is journaled. Near its outer end, the casing 55 supports a bearing 62 for the plug 47 which is received in the recessed end of the boring bar 48 and is coupled thereto by a tongue and groove connection 61. The reduced end 47ᵃ of the plug has fast thereon a bevel gear 60 from which the rotary motion of the spindle 23 is transmitted to the cutters 52 and 53.

Mounted on the outer end of the casing 55 for adjustment about the axis A—A is a housing 65 having a tubular extension 65ᵃ received on the reduced end of the casing 55 in abutment with a flange 55ᵃ. This relation is maintained and rotary adjustment of the housing permitted by T-bolts 86 extending through and anchored in the flange 55ᵃ with their heads seated in annular T-slots 86ᵃ in the face of the extension 65ᵃ. A second tubular extension 65ᵇ of the housing 65 concentric with the axis B—B provides a bearing for a second housing 74 having a flange 74ᵃ formed with an annular axially facing T-slot 97 and held in abutment with a flange 65ᶜ by bolts 96. The latter are anchored in the flange 65ᶜ and have their heads seated in the slot 97. The housing 74 is thus mounted to swivel about the axis B—B.

The cutter 52 is attached in a well known manner to the projecting end 75 of a spindle 54 journaled at opposite ends in bearings 72 and 73 supported by the housing 74. Within the housing, the spindle has fast thereon a bevel gear 71 which meshes with a gear 70 on the end of a shaft 64 extending through the housing 65 along the axis B—B and journaled in bearings 67 supported by the housing. Fast on the shaft 64 and journaled in the bearings 66 is a bevel gear 63 which meshes with the drive gear 60. The end 68 of the shaft 64 remote from the shaft 54 projects from the housing 65 and is adapted to receive the shank of the milling cutter 53.

From the foregoing, it will be seen that the driving connections are such as to permit swiveling of the housing 65 about the axis A—A to move both the spindle shafts 64 and 54 about this axis. In addition, the housing 74 may be swiveled about the axis B—B to effect a further adjustment of the spindle 54. In other words the spindle 54 may be shifted bodily about either or both of the axes A—A and B—B. The axis of the auxiliary spindle 54 is offset laterally a sufficient distance from the axis of the shaft 58 (Fig. 3) that adjustment of the cutter on the spindle 54 may be had through a full 360 degrees without interference by the housing 55.

Figure 4:
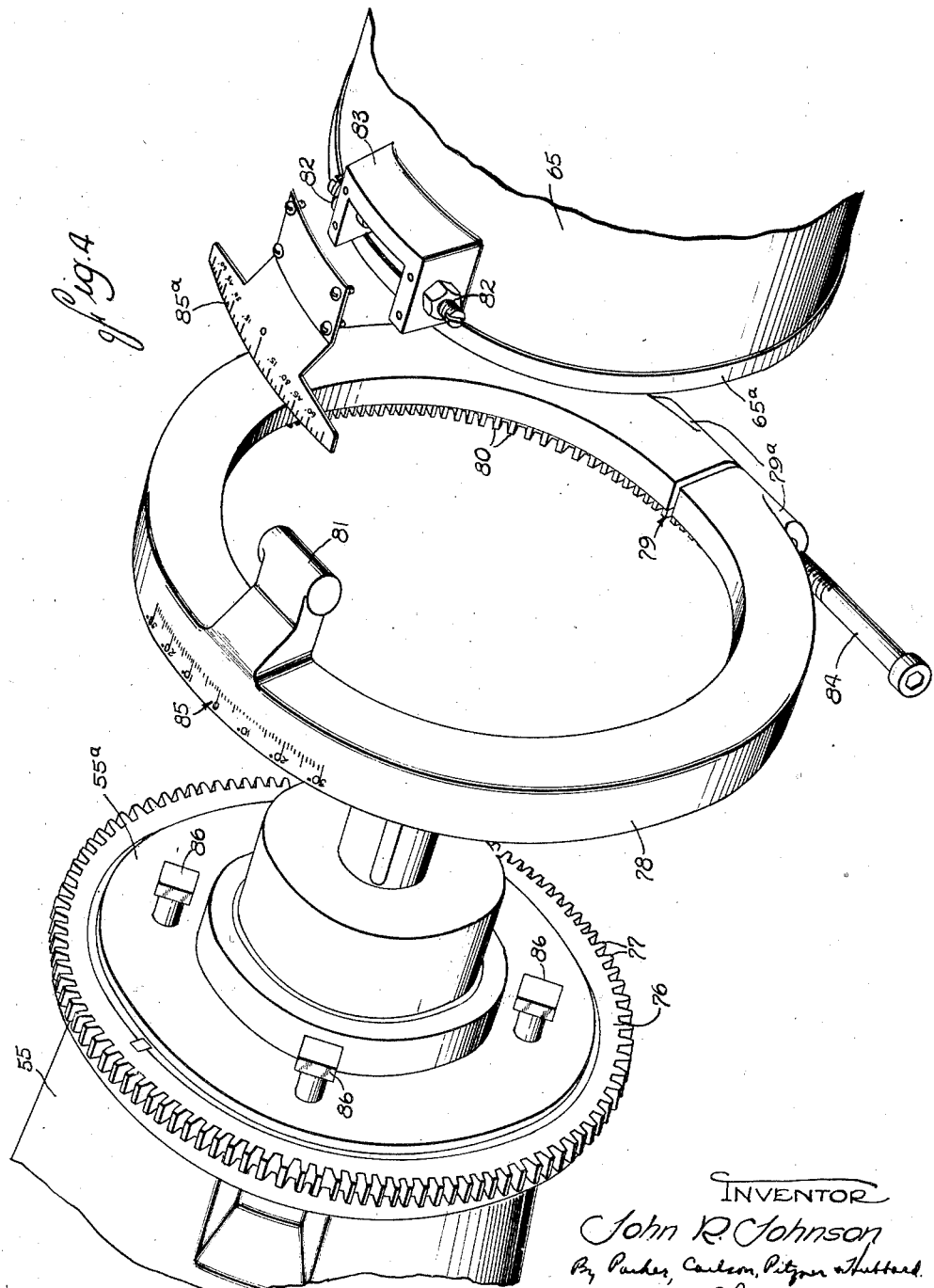
Fig. 4 is an exploded perspective view of the parts of adjusting and locking mechanism for a portion of the cutter head.

In view of the heavy loads to which the cutters may be subjected, novel adjusting and locking mechanisms have been provided to insure rigid connection of the housings 55, 65, and 74 after adjustment of the cutter. These mechanisms are similar in construction and that for the housing 65 comprises a pair of concentric rings 76 and 78 fast respectively on the housing 65 and its supports 55ª and having mating teeth on their adjacent surfaces which may be moved into engagement to lock the members positively against relative rotation. As shown in Fig. 4, the ring 76 has teeth 77 on its outer periphery and is keyed to the guide flange 55ª on the housing 55. The ring 78 is split radially as indicated at 79 and has teeth 80 on its inner surface encircling the ring 76. Relative rotation between the split ring 78 and the housing 65 is prevented by the engagement of a lug 81 on the split ring, with a pair of abutments in the form of screws 82 threaded in the opposite side walls of a yoke 83 integral with the housing 65. Threading through lugs 79ª (Fig. 4) on the split portions of the ring 78 is a screw 84 which may be turned to expand or contract the ring. When the ring 78 is contracted about the ring 76 with the teeth 77 and 80 engaged, the housing 65 will be locked firmly to the casing 55. By loosening the screw 84 to relieve the clamping pressure, the ring 78 may be shifted axially to disengage the teeth 80 from the teeth 77 after which the housing 65 may be turned as desired. After adjustment, the rings are reengaged and locked together by tightening the screw 84.

The numbers of teeth on the rings 76 and 78 are so chosen that an advance of one tooth therebetween will effect an angular adjustment of the housing 65 of fixed amount. In the preferred construction illustrated, 120 teeth are provided on the ring 76 so that the housing 65 may be adjusted about the axis A—A in increments of three degrees each. Finer adjustment may be effected by shifting the screws 82 to move the lug 81 and its attached split ring 78 with respect to the housing 65. The amount of this latter adjustment is determined by cooperating marks 85 on the periphery of the split ring 78 and a scale 85ª (Figs. 4 and 5) which overlies the same. An accurate vernier adjustment is thus provided. After the housing has been adjusted in the manner described above, the bolts 86 may be tightened to effect final rigid locking of the housing 65 to the casing 55.

Figure 3:
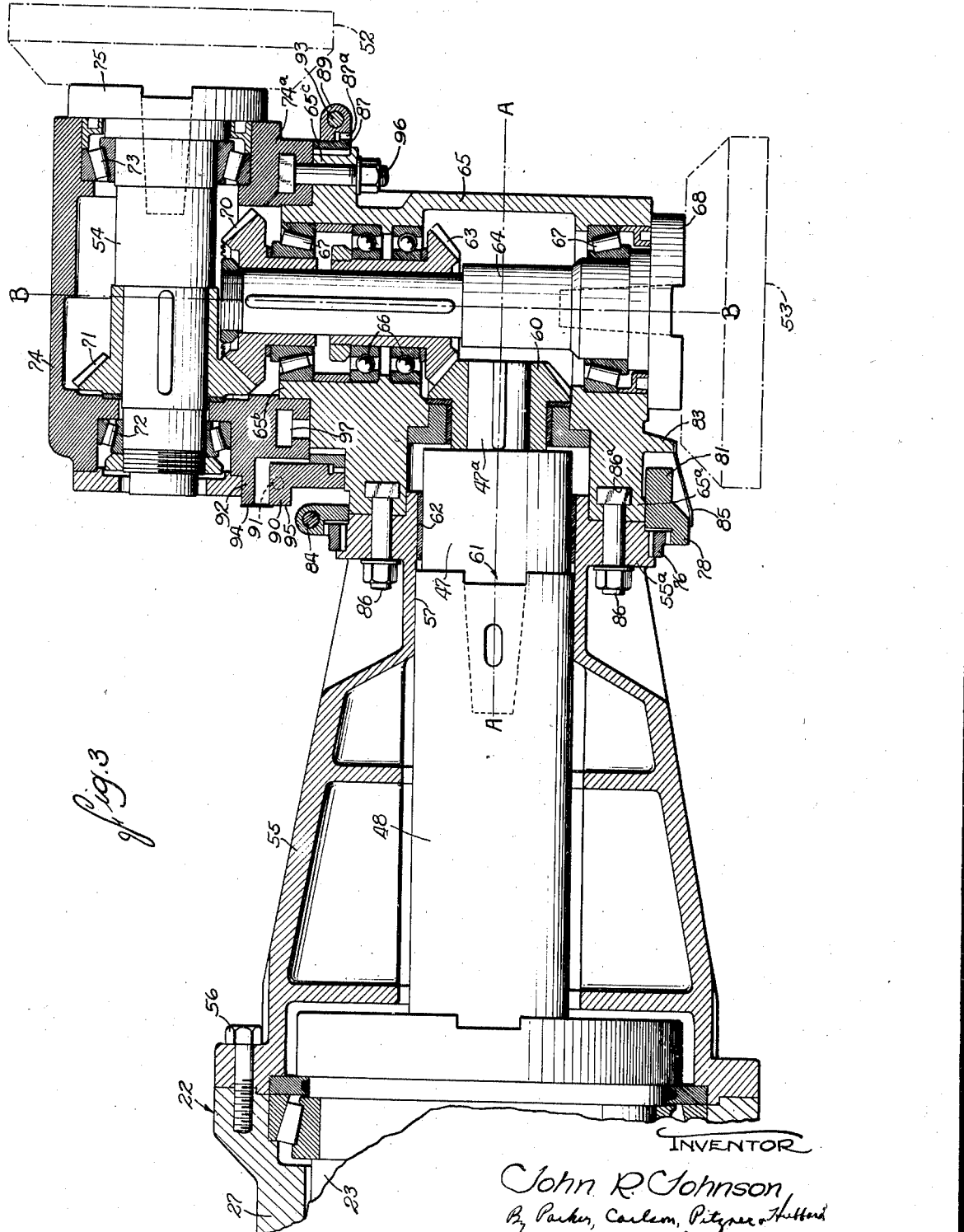
Fig. 3 is a fragmentary longitudinal sectional view through the cutter head.
Figure 5:
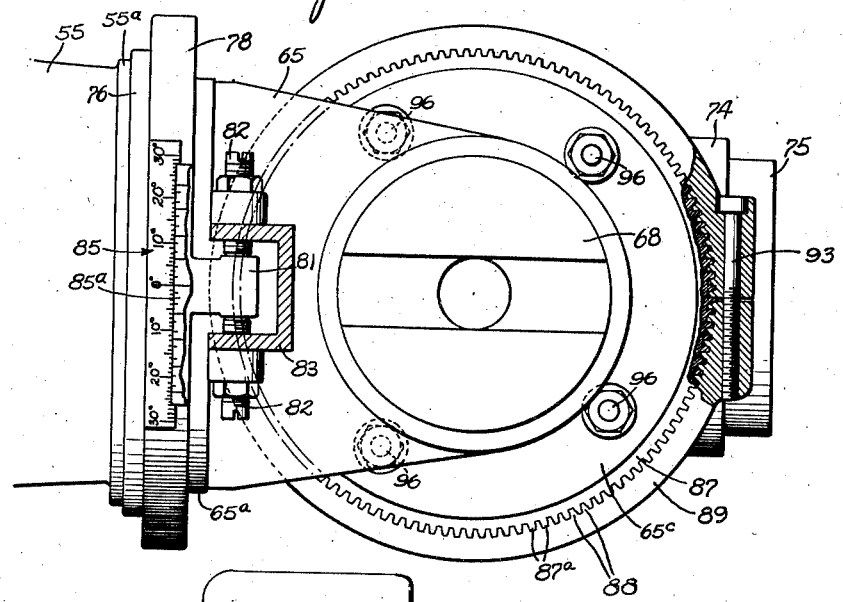
Fig. 5 is an end elevation partly in section of the outer portion of the cutter attachment head shown in Fig. 3 and illustrating particularly the adjustment mechanism therefor.
Figure 6:
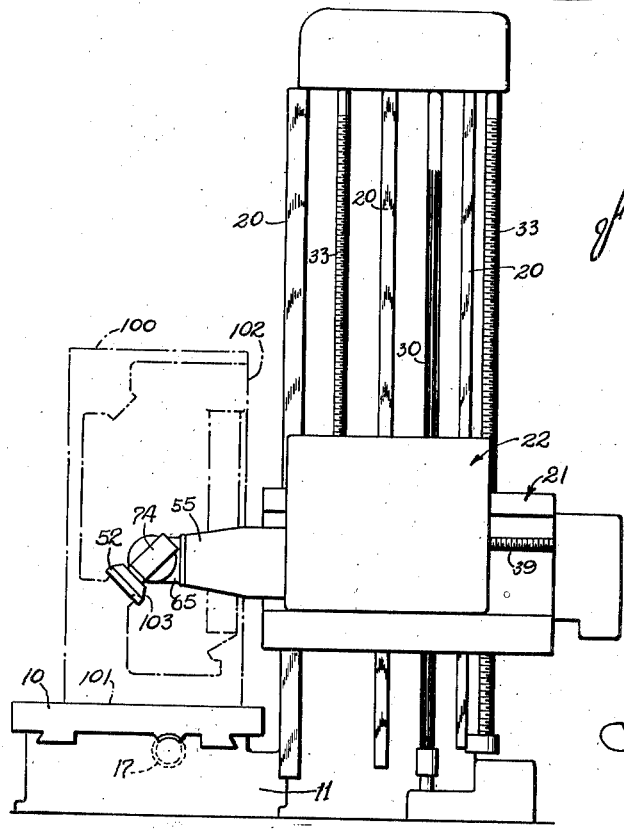

Upon reference to Figs. 3 and 5, it will be seen that the housing 74 is adjustably locked in position on the casing 65 by a similar mechanism including a ring 87 keyed to the guide flange 65ᵇ on the outer end of the casing 65 and having teeth 87ª meshing with complemental teeth 88 on a resilient split ring 89 encircling the same. The split ring is adjustably made fast to the housing 74 by a lug 90 interposed between adjusting screws 91 (Fig. 3) threaded in the opposite side walls of a yoke 92 which is integral with the housing 74. As in the case of the mechanism previously described, the split ring 89 is releasably clamped on the fixed toothed ring 87 by a screw 93 which serves to draw the ends of the split ring together. The teeth 87ª on the fixed ring 87 are also preferably 120 in number so that an advance of one tooth effects an angular adjustment of three degrees while adjustments of a lesser angularity are had by changing the position of the lug 90 with respect to the casing 65 through the medium of screws 91. A scale plate 94 (Fig. 3) secured to the yoke 92 overlies a complemental scale 95 on the split ring 89 to indicate the degree of angular adjustment effected by the screws 91. Rigid connection of the housings 65 and 74 after the latter have been located in the desired angular position is effected by tightening the bolts 96.

The machine tool above described is extremely versatile in its operation and is adapted to face mill surfaces disposed at widely varying angles not only on the exterior of a work piece but is particularly adapted to machine surfaces on the interior of relatively large work pieces such, for example, as large dies or the supporting boxes therefor. Thus, the face of the cutter 52 may, by bodily adjustment of the cutter about the axes A—A and B—B, be disposed at any desired plane. Then, by reciprocating the work table 10, by moving the saddle 21 vertically, or by sliding the tool head 22 horizontally, a surface extending in any one of three transverse directions may be milled. Such versatility of the machine tool will be apparent from Figs. 6 to 9 which illustrate the manner of milling different surfaces on the interior of a work piece 100 while the latter is supported with one of its flat exterior sides 101 clamped against the table 10 and with its open side 102 facing toward the column 19.

It will be observed from Fig. 1 that by spacing the head ways 26 vertically, both of them may be located closely adjacent the column ways 20. This makes for an extremely compact arrangement of the parts on the head and saddle because the required spacing of the ways may be obtained with a head of minimum horizontal depth. In addition, the bending stresses exerted on the saddle as an incident to the various machining operations are reduced to a minimum because no one of the head ways overhangs the ways 20 to any substantial degree.

For example, it may be desirable to fashion a flat surface 103 within the interior of the work piece, this surface being disposed angularly with respect to all of the exterior surfaces of the work piece on which it might be supported. In such case, the housing 65 is first adjusted so that the intermediate shaft or spindle 64 therein is in an exactly horizontal position. The angular position of the housing 74 is then adjusted through the medium of the adjustment and locking mechanism heretofore described until the active face of the cutter 52 is disposed at exactly the desired angle. These adjustments having been effected, the tool head assembly 22 is advanced along the ways 26 to position the cutter 52 within the hollow work piece. Then, the driving motor 24 is started, and the table 10 is traversed at a suitable feed rate to move the portion of the work piece to be machined across the face of the cutter.

Similarly, if it is desired to machine a downwardly facing but angularly disposed surface 104 (Fig. 7), the angular adjustment of the housing 74 is changed to position the cutter 52 at exactly the angle required, and the saddle 21 is traversed upwardly on the column 19 to position the cutter at the desired vertical height. Then, as in the previous case, the work piece is moved across the face of the rotating cutter by advancing the table 10 at a feed rate.

Fig. 8 illustrates the position of the housing 74 and cutter 52 for machining a flat surface 105 within the work piece 100, but in this instance, it will be noted that the surface to be machined faces outwardly away from the tool head assembly. As was previously noted, however, the casing 74 may be rotated about the axis B—B through a full 360 degrees without interference of the cutter 52 with the casing 55 and consequently, the casing 74 may be adjusted without difficulty to the position shown in Fig. 8. As in the previous instance, the machining operation is effected by advancing the table 10 at a feed rate to move the work piece past the face of the rotating cutter.

Fig. 9 illustrates the use of the machine in milling an interiorly located vertical surface 106 on the work piece 100. For this operation, the housing 65 is rotated about the axis A—A through the medium of its adjustment mechanism to position the shaft 64 therein vertically. The housing 74 is then swiveled about the axis B—B in order to position the cutter 52 in a position of selected angularity and the table 10 advanced to bring the work piece into operative relation with the cutter. A feed movement is then effected by traversing the saddle 21 along the column 19 while rotating the cutter.

It will be apparent to those skilled in the art that many other adjustments of the cutter or cutters may be had to facilitate the machining of surfaces which are difficult if not impossible of access with ordinary milling machines. It will also be seen that, despite the extremely wide variation in positions of the cutter, all of the adjustments may be effected with precision, and the movable unitary tool head assembly 22 furnishes such a rigid support for the tool head attachment and driving spindles that flexure of the tool shafts or spindles with consequent inaccuracies in the machining operations is reduced to a minimum.

I claim as my invention:

1. A machine tool comprising, in combination, a work supporting table mounted for horizontal reciprocation, an upstanding column fixedly mounted at one side of said table and having vertical ways thereon, a saddle movable vertically along said column ways, a head horizontally slidable on said saddle, an elongated horizontal tool spindle, bearing means journaling said spindle in said head and supporting the same therein throughout a substantial portion of the spindle's length with an end portion of the spindle overlying said table, said spindle end portion being adapted to support a cutter, a prime mover power actuating mechanism for rotating said spindle mounted on said head and constituting therewith a unitary structure, and means for traversing said head on said saddle axially of said spindle to project the latter bodily a desired distance over said table while retaining said spindle fully supported within said head by said bearing means.

2. A machine tool comprising, in combination, a horizontally reciprocable work supporting table, an upstanding column fixedly mounted at one side of said table and having vertical ways thereon, a saddle movable vertically along said column ways, a pair of vertically spaced guide surfaces on one side of said saddle, a head having complemental guide ways on one side thereof mating with said guide surfaces on said saddle to support said head thereon for horizontal sliding movement, an elongated tool spindle, bearing means journaling said spindle in said head and supporting the same therein throughout a substantial portion of the spindle's length with an end portion of the spindle overlying said table, said spindle end portion being for the attachment of a cutter thereto, a prime mover power actuating mechanism for rotating said spindle mounted on said head in front of said guide surfaces and constituting with said head a unitary structure, means for traversing said head on said saddle guide surfaces axially of said spindle to project the latter bodily a desired distance over said table while retaining the spindle fully supported within said head by said bearing means.

3. A machine tool comprising, in combination, a horizontally reciprocable work supporting table, a normally stationary vertical column mounted at one side of said table and having vertical ways thereon, a saddle movable vertically along said column ways, a pair of vertically spaced guide surfaces on one side of said saddle, a head having complemental guide ways on one side thereof mating with said guide surfaces on said saddle to support said head thereon for horizontal sliding movement, an elongated tool spindle, bearing means on said head journaling said spindle throughout a substantial portion of the spindle length and for axial movement of the spindle to project one end portion thereof over said table, power driven actuating mechanism for rotating said spindle, means by which said spindle may be fed axially relative to said head, means for traversing said head on said saddle guide surfaces while retaining the spindle fully supported within said head by said bearing means.

4. A machine tool comprising, in combination, a horizontally reciprocable work supporting table, a normally stationary vertical column mounted at one side of said table and having vertical ways thereon, a saddle movable vertically along said column ways, horizontal spaced guide surfaces on one side of said saddle extending transversely of said table, a head having complemental guide ways mating with said guide surfaces on said saddle to support said head thereon for horizontal sliding movement, a tool spindle adapted to support a cutter and comprising an element rotatable on said head to turn about an axis paralleling said guide surfaces and an inner element splined in said rotatable element to permit one end to be projected over said table, power driven actuating mechanism for rotating said spindle, and means by which said head may be fed endwise and said spindle may be fed axially relative to the head.

5. A machine tool comprising, in combination, a work supporting table reciprocable along fixed horizontal ways, a stationary vertical column mounted at one side of said table and having vertical ways on the front face thereof spaced laterally of the direction of reciprocation of said table, a saddle movable vertically along said column ways whereby the latter provide the sole means of supporting and guiding the saddle, a pair of separate vertically spaced horizontal guide surfaces on said saddle disposed in front of and closely adjacent said column ways, a head having complemental guide ways on one side thereof mating with said guide surfaces on said saddle to support said head thereon for horizontal sliding movement, a tool spindle journaled on said head in front of said saddle ways and projecting horizontally with one end portion facing said table and adapted to be shifted to various positions overlying said table by movement of said head along said guide surfaces, said spindle being adapted for connection with a cutter for operating on a work piece supported by said table, rotary power driving actuating mechanism carried by said head and operable to rotate said spindle, and power driven means by which said head may be fed axially relative to said saddle and the latter may be fed along said column.

JOHN R. JOHNSON.